United States Patent
Hehn

(10) Patent No.: US 10,462,843 B2
(45) Date of Patent: Oct. 29, 2019

(54) METHOD FOR THE DIGITAL TRANSMISSION OF DATA BLOCKS FROM A TRANSMITTING STATION TO A RECEIVING STATION AS WELL AS A SENDING STATION, A RECEIVING STATION AND A MOTOR VEHICLE FOR USE IN THE METHOD

(71) Applicant: VOLKSWAGEN AG, Wolfsburg (DE)

(72) Inventor: Thorsten Hehn, Wolfsburg (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/675,169

(22) Filed: Aug. 11, 2017

(65) Prior Publication Data
US 2018/0054849 A1 Feb. 22, 2018

(30) Foreign Application Priority Data

Aug. 16, 2016 (DE) .................. 10 2016 215 238
Dec. 16, 2016 (DE) .................. 10 2016 225 224

(51) Int. Cl.
*H04W 84/18* (2009.01)
*H04W 84/00* (2009.01)
(Continued)

(52) U.S. Cl.
CPC .......... *H04W 84/18* (2013.01); *H04L 1/0041* (2013.01); *H04L 1/0045* (2013.01);
(Continued)

(58) Field of Classification Search
CPC ....... H04L 1/1812; H04L 1/08; H04L 5/0055; H04L 1/1819; H04L 5/00; H04L 1/0061;
(Continued)

(56) References Cited

U.S. PATENT DOCUMENTS 8,107,542 B1 1/2012 Lou et al.
2002/0103953 A1 8/2002 Das et al.
(Continued)

FOREIGN PATENT DOCUMENTS

DE 102011002823 A1 7/2012
EP 2403174 A1 1/2012
WO 2007087511 A2 8/2007

OTHER PUBLICATIONS

Performance and Delay Analysis of Hybrid ARQ With Incremental Redundancy Over Double Rayleigh Fading Channels by Chelli et al., dated Nov. 11, 2014.*

Primary Examiner — Daniel Lai
(74) Attorney, Agent, or Firm — Barnes & Thornburg LLP

(57) ABSTRACT

A method for the digital transmission of data blocks from a transmitting station to a receiving station, wherein delta information is generated at the transmitting end which indicates the positions at which a further data block differs from the preceding data block. The delta information is provided with error protection and is added to the further data block and is transmitted. The received first and the at least one extended further data block are stored in the receiving station. The delta information of the at least one extended further data block is then retrieved and applied to the stored preceding data block. It is thereby made comparable with the at least one further data block. A soft combining of the received further data block and the transformed preceding data block is then carried out. The payload of the further data block is retrieved from the combined data block.

16 Claims, 4 Drawing Sheets

(51) Int. Cl.
*H04W 4/70* (2018.01)
*H04L 1/00* (2006.01)

(52) U.S. Cl.
CPC ............ *H04L 1/0072* (2013.01); *H04W 4/70* (2018.02); *H04W 84/005* (2013.01); *B60W 2550/408* (2013.01)

(58) Field of Classification Search
CPC ... H04L 1/0009; H04L 1/1816; H04L 1/1896; H04L 5/0044; H04L 1/0075; H04L 1/1845; H04L 1/1864; H04L 1/1874; H04L 1/00; H04L 1/0033; H04L 1/0045; H04L 1/18; H04L 1/1825; H04L 1/0054; H04L 63/0428; H04W 24/02; H04W 76/14; H04W 88/02; H04W 28/04; H04W 28/06; H04W 28/12; H04W 4/40; H04W 4/70; H03M 13/09; H03M 13/6306; H03M 13/29; H03M 13/005; H03M 13/095; H03M 13/1111; H03M 13/3769; H03M 13/45; H03M 13/6362; H04J 13/0007; H04J 13/10
See application file for complete search history.

(56) References Cited

U.S. PATENT DOCUMENTS

| 2003/0008614 | A1 | 1/2003 | Hanson et al. | |
|---|---|---|---|---|
| 2004/0132442 | A1* | 7/2004 | Zimmermann | H04L 1/0003 455/423 |
| 2005/0097425 | A1* | 5/2005 | Golitschek | H04L 1/0003 714/749 |
| 2008/0279312 | A1* | 11/2008 | Stewart | H03M 13/3769 375/340 |
| 2009/0034556 | A1* | 2/2009 | Song | H04L 69/22 370/471 |
| 2014/0053047 | A1* | 2/2014 | Li | H03M 13/23 714/786 |

* cited by examiner

METHOD FOR THE DIGITAL TRANSMISSION OF DATA BLOCKS FROM A TRANSMITTING STATION TO A RECEIVING STATION AS WELL AS A SENDING STATION, A RECEIVING STATION AND A MOTOR VEHICLE FOR USE IN THE METHOD

PRIORITY CLAIM

This patent application claims priority to German Patent Application Nos. 10 2016 215 238.6, field 16 Aug. 2016, and 10 2016 225 224.0, filed 16 Dec. 2016, the disclosure of which are incorporated herein by reference in their entireties.

SUMMARY

Disclosed embodiments relate to a method for the digital transmission of data blocks via a faulty transmission channel to at least one receiving station. Disclosed embodiments further relate to an adapted transmitting station and an adapted receiving station for use in the method. Disclosed embodiments similarly relate to a motor vehicle in which an adapted transmitting station and/or receiving station is installed.

BRIEF DESCRIPTION OF THE DRAWINGS

An exemplary embodiment is shown in the drawings and is explained in detail below with reference to the figures. In the drawings.

DETAILED DESCRIPTION

Figure 1:
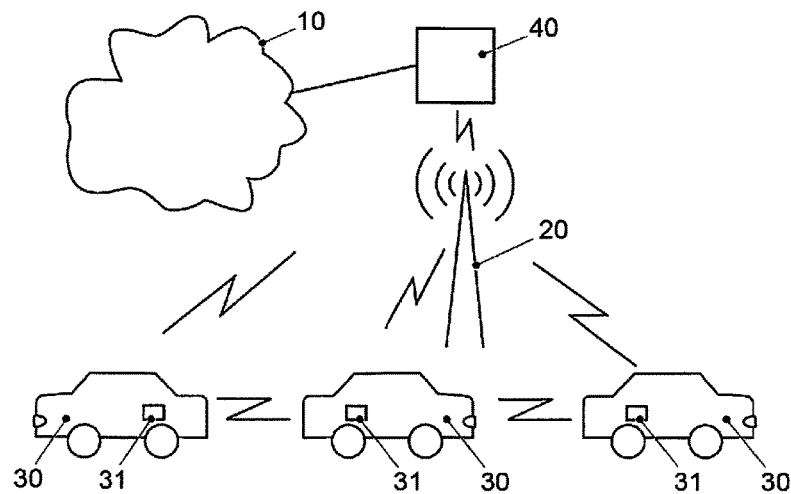
FIG. 1 shows the principle of vehicle communication via a mobile radio.

For the scenario involving vehicles equipped with radio-communication modules which communicate directly with one another in public road traffic, whether it be for cooperative or autonomous driving, a very high reliability is highly important for safety-critical applications. Technologies for direct vehicle-to-vehicle communication have already been developed and continue to be developed. Direct vehicle communication via WLAN, here, in particular, the embodiment according to the IEEE 802.11p WLAN standard, can be cited as an example. With this technology, ad hoc WLAN networks are set up for communication between the vehicles (communication in the "Ad Hoc Domain").

However, vehicle communication is also possible in the mobile networks domain. With this technology, however, the base station must convey the messages from vehicle to vehicle. This is the area in which the communication takes place in the "Infrastructure Domain". Direct vehicle communication is also enabled for the forthcoming mobile radio generation. In LTE, this embodiment is known as LTE-V, in the 5G initiative, this embodiment is known as D2D.

Typical communication scenarios are safety scenarios, traffic efficiency scenarios and infotainment. The following scenarios are mentioned for the safety domain: "Cooperative Forward Collision Warning", "Pre-Crash Sensing/Warning", "Hazardous Location Warning". In these areas, vehicles exchange information with one another, such as position, direction and speed, and also parameters such as size and weight. Further information which is transmitted relates to intention information, such as vehicle intends to overtake, vehicle turns off left/right, etc., which are relevant to cooperative driving. Sensor data are often transmitted here. If a hazardous situation arises and the driver does not react, the automobile could automatically brake so that an accident is prevented or at least the consequences are minimized if an accident is unavoidable.

Vehicle-to-vehicle communication is often also referred to as Car-to-Car communication (C2C). Vehicle-to-Vehicle communication (V2V) is a commonly used term. This means direct information exchange between driving vehicles. Operational radio networks and new applications can be implemented with this mobile communication. These include timely information relating to road and traffic situations, and also information relating to road condition, black ice, aquaplaning, accidents or stationary vehicles. In this safety-related application, the corresponding road user transmits the indication of the hazard location along with the data from the navigation system.

Further information relating to the traffic flow includes indications of traffic light phases, stop-and-go journeys or constant starting and stopping at roadworks, etc. The search for a parking lot or information relating to free parking lot capacities can also be incorporated into a vehicle-to-vehicle communication of this type. Furthermore, intelligent convoy driving is also mentioned as an application, also referred to as "High Density Platooning". The distances between the vehicles in the convoy, e.g., trucks, are adapted and controlled according to the respective traffic situation. The aim is to minimize the distance between the convoy vehicles and reduce energy consumption. Messages must be constantly exchanged between the convoy vehicles for this purpose.

Standardized messages are often exchanged between the vehicles via the air interface. The messages relating to the current traffic situation are managed in ITS (Intelligent Transport System) stations and are transmitted cyclically or in an event-related manner. The Cooperative Awareness Message (CAM), Decentralized Environmental Notification Message (DENM), Signal Phase and Time (SPaT) message and Topology Specification (TO-PO) message exist.

The radio messages transmitted from a vehicle contain the vehicle position determined via the GPS system, along with time and speed data and, in addition, according to the traffic situation, the area is defined in which other vehicles need to be warned and the event is transmitted in coded form.

Vehicles which receive the radio messages can operate as repeaters and further distribute the message, thereby increasing the information space. How far the message is distributed depends on the relevance zone, i.e., the area which is relevant to the event. In the case of a sudden braking, the relevance zone is obviously substantially smaller than in the case of a notification of a tailback. This relevance zone is predefined by the transmitting vehicle, as a result of which the distribution via the repeater vehicles encompasses a lesser or greater area.

The listing shows that time-critical data transmissions take place, particularly in the safety domain. The reliability of the vehicle-to-vehicle communication is therefore of crucial importance.

In mobile radio, data transmission reliability means completeness (all transmitted payload data arrive at the receiver) and correctness (the transmitted payload data and the payload data retrieved from the received data match one another). Different methods are used in mobile radio technologies for this purpose, e.g., frequency diversity, spatial diversity, appropriate selection of the modulation type and modulation parameters and the channel code to be used, as well as the code rate, etc.

Diversity is a fundamental method for making transmissions fault-resilient in communications engineering. The basic principle of diversity is that different representations of specific information are transmitted to the receiver on channels that are as independent as possible. The receiver uses the reception observations of these independent channels and combines them in a constructive manner. As a result, the original information can be reconstructed with a substantially higher probability than if only a single observation had been taken into account. The resilience of the communication is thereby increased and the receiver perceives a reliable communication with low latency.

An example in which "soft combining" is used in mobile radio is the Hybrid Automatic Repeat Request (HARQ) method which is used in LTE. A description can be found in EP 2 403 174 A1.

The aforementioned independent channels can be segregated from one another on a temporal or frequency-related basis, or by other orthogonalization schemes.

However, constructive heterodyning at the receiver can be used only if the same payload signal is transmitted via the different channels. In a vehicle-related context, the case often occurs where status reports (e.g., messages) are transmitted. These differ only slightly from one another, but are not identical. As a result, the receiver must deal with each message separately and no longer benefits during reception from the fact that a plurality of messages are transmitted to it.

For C2C communication, it has been recognized that many similar status messages are transmitted multiple times after one another. The disclosed embodiments exploit this time diversity of the status messages to improve the signal evaluation. The problem exists here that a conventional soft combining cannot be used due to the prevailing differences in the status messages.

The disclosed embodiments provide an extended soft combining method in which a plurality of reception observations can be processed jointly, even if they are not based on the same payload signal, but only on similar payload signals, as in the case of the C2C communication domain.

Disclosed embodiments provide a method for the digital transmission of data blocks, a transmitting station, a receiving station, and a motor vehicle.

The proposed method is used for the digital transmission of data blocks from a transmitting station to a receiving station. A data block is provided with error protection data at the transmitting end and the data block provided with error protection is transmitted via a faulty transmission channel to the receiving station. The method is characterized in that, for the transmission of at least one further data block, the positions at which the further data block differs from the preceding data block are identified at the transmitting end. Delta information is thus obtained. The delta information obtained in this way is provided with its own error protection data. This delta information with error protection is then added to the at least one further data block provided with error protection and the further data block extended in this way is similarly transmitted via the faulty transmission channel to the receiving station. The received first and the at least one extended further data block, including the error protection component, are then stored at the receiving end. An operation then follows in which the delta information of the at least one extended further data block is first retrieved. The retrieved delta information is applied to the stored preceding data block to change the latter into a form which makes it comparable with the at least one further data block. The preceding data block is therefore transformed with the delta information in such a way that, apart from errors, it has the same information content as the further data block. The received at least one further data block and the transformed received preceding data block are then combined through soft combining. The payload of the further data block is finally retrieved from the combined data block.

Significant benefits in terms of reliability of the data transmission are achieved by the proposed method. Through skillful choice of the parameter n, very high gains in the signal-to-noise ratio can be achieved, e.g., if n=2 up to 3 dB, if n=10 up to 10 dB, which are of interest above all to chip developers for the development of radio modems for the automobile industry.

It is highly beneficial if the delta information is provided with a higher error protection than the payload data part of the further data block. It is thereby achieved that the delta information can be retrieved even if the error protection is no longer adequate for the payload data. Since the delta information is smaller than the payload data information, the method remains efficient even if a higher error protection for the delta information is allowed.

It is beneficial if the delta information indicates the positions in the coded further data block at which data information is set differently than in the preceding coded data block. It is therefore indicated here where differences occur in the payload data field and where differences occur in the error protection field. Conversely, the delta information could also be specified in such a way that it indicates the positions in the coded preceding data block at which information is set differently than in the coded further data block.

The received preceding data block and the at least one extended further data block may be stored in each case as a sampled signal before or after the digital demodulation. If they are stored after the digital demodulation, the data can be stored as a log likelihood ratio information block. The application of the delta information can thus be carried out extremely efficiently using changes of sign. Otherwise, signal sampling values have to be processed, which is more complex. To apply the delta information to the stored preceding data block, the data sequence for the symbol containing the bit which is intended to be set differently would then be replaced with a data sequence which represents the appropriate symbol in which the corresponding bit is set differently.

The delta information could also be applied reciprocally to the stored at least one further data block and the transformed at least one further data block and the preceding data block could then be combined. Thus, the payload of the preceding data block could then be retrieved.

The transformed data block may be combined with the other data block through addition of mutually corresponding soft information values of the data blocks to be combined.

A channel decoding of the respectively combined data block is carried out in each case to retrieve the at least one further data block or the preceding data block.

If the delta information is to be even further minimized, it is beneficial if the delta information specifies only the positions in the payload data field of the further data block at which data information is set differently than in the payload data field of the preceding coded data block. The delta information is restricted here to details for the payload data field.

This embodiment of the method operates efficiently if the delta signal is compact. This is precisely the case if a linear systematic coding (input signal can be found at fixed, predefined positions in the coded signal) is used. The delta information to be transmitted is then restricted to differences in the original payload signal. The receiver can itself highly efficiently identify the changes in the redundancy part (error protection data part) of the coded signal in the linear code.

The proposed method can be used for block codes and also for convolutional codes.

The present description illustrates the principles of the disclosure. Persons skilled in the art will therefore obviously be capable of designing a variety of arrangements which are not explicitly described here, but embody principles of the disclosure and are similarly intended to be fully protected.

FIG. 1 shows the principle of vehicle communication by mobile radio. The vehicles are denoted with reference number 30. They are equipped in each case with an on-board unit 31 which serves as a transmitting station and receiving station for mobile communication. All messages from the vehicles (uplink) and to the vehicles (downlink) are either routed via a base station which serves one mobile radio cell or, in the case of direct vehicle communication (sidelink), are exchanged directly between the vehicles. If the vehicles are located within this mobile radio cell, they are registered with or logged in to the base station 20 (known as eNodeB in LTE terminology). If they leave the mobile radio cell, they are transferred to the adjacent cell (Hand Over) and are deregistered or logged out from the base station 20. The base station 20 also provides access to the Internet 10 so that the vehicles 30 or all other mobile radio participants in the mobile radio cell are supplied with Internet data. To do this, the base station 20 is connected via the S1 interface to the EPC 40 (Evolved Packet Core).

Along with LTE mobile radio technology, the vehicles 30 in the example are similarly equipped with WLAN technology according to the IEEE 802.11p standard for direct vehicle communication. With this technology, ad hoc WLAN networks are set up for communication between the vehicles (communication in the "Ad Hoc Domain"). This technology was specially developed for the reciprocal exchange of specific messages at local level. This data exchange also relates to safety-critical data and operates even if the mobile radio network becomes overloaded in one cell, or even in areas with poor mobile radio network coverage. WLAN technology according to IEEE 802.11p is also integrated into the on-board unit 31.

Reference is made to the various specifications of the standard for details relating to IEEE 802.11p technology.

With LTE mobile radio technology, multiple use is made of the soft combining technique in the HARQ process. The data are transmitted with error protection in the radiocommunication. The HARQ process, corresponding to Hybrid Automatic Repeat Request, represents a good compromise between the number of error protection data per transmitted data block and the required data throughput. The more error protection data that are added, the smaller the number of payload data which can be transmitted per time unit becomes. For this reason, the HARQ method is implemented in LTE after the transport blocks which, despite the error protection, could not be retrieved or, if necessary, are repeated multiple times, wherein the error protection is successively increased with each repetition.

This means that a data block or, in the terminology of mobile radio standards, a transport block is normally protected with Forward Error Correction (FEC). The receiver attempts to decode the transport block using the FEC data. If this does not succeed, the transmitter is requested to transmit additional redundancy, i.e., more error protection data. A new decoding attempt is started with the originally received data and the additional redundancy.

As mentioned above, the HARQ process is a central element for ensuring the required reliability in the data transmission. It is installed at the transmitting end and, on the basis of responses from the receiver, adaptively transmits additional data which increase the resilience of the transmission as a whole. The packet error rate following the HARQ process is significantly lower. However, the HARQ process takes time, thereby increasing the latency of the data transmission.

Two conventional procedures are described below to explain the problems more precisely. It is first described how status messages are processed independently from one another by the receiver. The aforementioned CAM messages which are transmitted via the IEEE 802.11p standard are cited as an example. Secondly, the soft combining technique used in mobile radio is explained. The soft combining technique is used intensively in mobile radio, particularly in LTE with the HARQ (Hybrid Automatic Repeat Request) process, since it is the most efficient way to exploit time diversity for an improvement in the signal-to-noise ratio and to combine the observations from independent channels at the receiver.

Each equipped vehicle normally transmits 10 CAM status messages per second in the C2C communication domain. In these status messages, the vehicle informs the environment of its current status, such as e.g., position, speed, etc. The status messages are processed independently from one another at the transmitting end (channel coding, modulation, etc.) and are also processed independently from one another at the receiver. The fact that much of the content of consecutive status messages is identical (header, unmodified data, etc.) is not taken into account here. An omission of the invariable information is not possible, so that each status message remains complete. No diversity is therefore exploited here.

With soft combining in mobile radio, time diversity is used intensively to deliver data efficiently to a receiver. For the sake of simplicity, a very simple scheme is considered in which the same representation of a given payload signal is transmitted via one channel at two different times. It is assumed that the channel implementations are independent from one another at the different times. The transmitter transmits a signal at two different times (repetition pattern). The receiver receives two transmissions of the signal which have been disrupted independently from one another due to different channel implementations.

Figure 2:
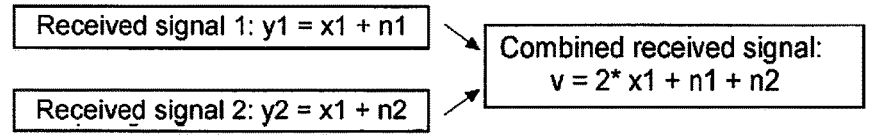
FIG. 2 shows the combination through the addition of two temporally separated data transmissions, one of which is the repetition of the first data transmission.

This is shown in FIG. 2. The payload signal is denoted by x1 therein. The interfering signal which is heterodyned with the payload signal, is denoted in FIG. 1 by n1 in the first transmission, and by n2 in the second transmission. The case is considered in which both signals, if processed independently, do not result in a valid decoding result in a channel decoder, the final operation in the processing chain on the Data Link Layer. It is then heterodyned, as shown in FIG. 1. The received signal values of the two received signals are combined to form a heterodyned signal. This involves a constructive combination of the signal values. In the simplest case, this operation is referred to as "equal gain combining", wherein the signal values of the received signals are added with equal weighting. The "maximum ratio combining" method is frequently used in the constructive combining. The signal values are weighted with the signal-to-noise ratio of the reception observation and are then added. The result is denoted in FIG. 2 by the reference y. This is typically done with the continuous values (soft info, such as, the log likelihood ratio) and a total observation is formed which constructively incorporates both partial observations, i.e., both partial observations must be adjusted to the correct phase positions before they are combined. The total observation is made available once more to the channel decoder. The probability of a successful decoding process is now significantly higher. The reason for this is that the payload component in both received signals is correlated, whereas the distortion, which is modelled as additive noise, is uncorrelated. The signal-to-noise ratio of the combined signal is up to 3 dB better than that of any individual signal.

The two reception information elements y1 and y2 are combined in the HARQ process. The following applies:

Received signal 1: $y1=x1+n1$

Received signal 2: $y2=x1+n2$

If the two received signals y1 and y2 are evaluated individually, it may be that neither y1 nor y2 can be evaluated in an error-free manner due to the noise component and the resulting errors which themselves are not correctable even by the supplied error protection. According to the principle of the soft combining technique, an improvement in the signal-to-noise ratio is achieved through addition of both received signals and, as a result, the payload in the combined signal can still be evaluated in an error-free manner. Addition produces $y=2*x1+n1+n2$ as a result.

Figure 3:
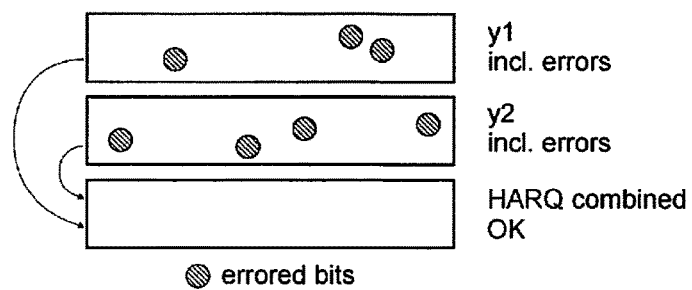
FIG. 3 shows the "soft combining" principle in a mobile radio.

This is shown in FIG. 3. The errored positions in the received signals y1 and y2 are illustrated by shading. The situation improves through addition, since the positions which are errored in the y1 signal are correct in the Y2 received signal and conversely are errored in the y2 signal and are correct in the y1 signal. The reason for this is that the payload component, including the error protection, in both received signals is correlated, whereas the distortion, which is regarded as additive noise, is uncorrelated. The signal-to-noise ratio of the combined signal is then up to 3 dB better than that of any individual signal.

Figure 4:
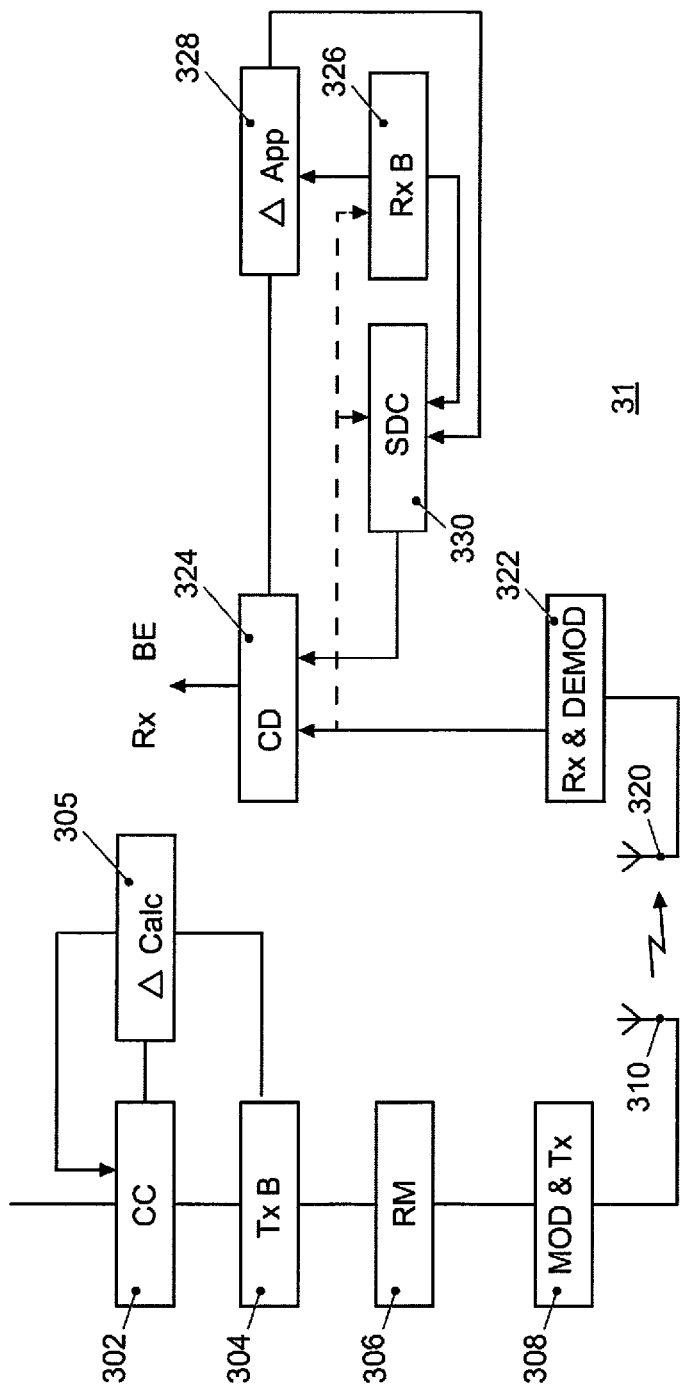
FIG. 4 shows a block diagram of a transmitting station and a block diagram of a receiving station.

FIG. 4 shows the part of the on-board unit 31 which is designed for communication via WLAN p. The left part of FIG. 4 shows the part of the transmitting station which is responsible for processing the transport blocks for transmission. The parts which are relevant to the disclosure and which play an important role at the receiving end in the receiving station are shown in the right part of FIG. 4.

The components at the transmitting end will first be explained. A block for channel coding is denoted by reference number 302. This block therefore adds the error protection to the actual payload data of the transport block. In the example, a Reed-Solomon code is calculated as the error protection code and is attached to the actual payload data as a block of error protection data. The RS code serves both purposes, i.e., error correction and error detection. If too many errored bits have occurred in the received signal, the RS code can no longer correct them, but can indicate, within certain limits, which bits are errored.

The completely coded data block is shifted into a transmit buffer 304. Before the signal coded for the status message 1 is transmitted, the bit-by-bit difference for the completely coded status message 2 compared with the first coded data block is calculated in block 305. This delta signal is similarly provided with error protection via channel coding. A higher error protection is generated than for the payload data of the data block. An RS code, for example, can similarly be used for this purpose, e.g., with a greater length. This data block provided with the delta signal is similarly stored in the transmit buffer memory 308. The data block to be transmitted is removed from there. A rate matching block 306 decides when this happens. This is followed by the modulation and the transmission signal processing in the modulation and transmission unit 308 and the emission of the data frame via the air interface by the transmit antenna 310. OFDM (Orthogonal Frequency Division Multiplexing) technology is used as the transmission technology in WLAN. This is the known multi-carrier transmission technology in which data symbols are modulated onto the individual carriers by QPSK (Quadrature Phase-Shift Keying) or QAM (Quadrature Amplitude Modulation). Both the payload signal and the generated delta signal of the data frame are jointly modulated and dispatched for the emission of the further data frame.

The signal received via the antenna 320 is evaluated at the receiving end in the reception and demodulation unit 322. The received signal is typically also errored. The signal is present following demodulation as a log likelihood soft decision information block. The individual bits of the demodulated symbols are not divided up through "hard decision" into fixed values "1" and "0", but rather a probability value is determined which indicates the probability with which the value is a "1" or a "0". The log10 of the ratio of these probability values is then formed. This information block is transferred into the receive buffer 326 and is stored there. The information block is also delivered to the channel decoding unit 324. The information block is forwarded to the downstream components in the receiving station only if it could be evaluated in an error-free manner. Otherwise the next information block is awaited. If the next information block could not be decoded in an error-free manner either, the following occurs. The delta signal retrieved in the evaluation of the second information block is applied in the delta application unit 328 to the first information block which is still present in the receive buffer 326. The delta signal can often be retrieved because it has been provided with the higher error protection.

The delta signal is applied through bit flipping, i.e., a "1" is set to a "0" and a "0" is set to a "1" at the positions which the delta signals indicates. If the information block is present as a log likelihood ratio information block, the bit flipping can be carried out highly efficiently through a change of sign in the bit positions concerned. This operation changes the first information block into an information block which corresponds to the information content of the second information block (payload signal plus the latter's error protection). Both information blocks are thereby comparable and can be further processed through soft combining. This also occurs in block 330. The transformed first information block and the second information block are added in the soft combining unit 330. The bit-by-bit logarithmic values of the probability ratio values are therefore added here. The result is again delivered to the channel decoder 324 which attempts once more to retrieve the payload of the second information block. This then often succeeds also due to the effect, already described above, of increasing the signal-to-noise ratio through the combination. If the channel decoding is successful, the payload data are forwarded to the downstream processing blocks in the receiving station 31.

Figure 5:
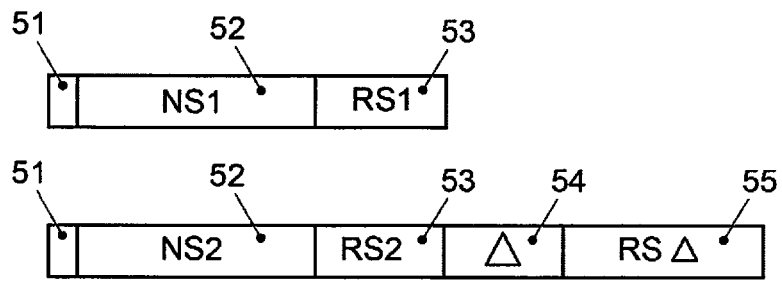
FIG. 5 shows the data frame formats for two consecutive data transmissions according to an exemplary embodiment.

FIG. 5 shows the format of the first and second information block as they are generated at the transmitting end. The format of the first information block is shown in the upper part with a field 51 in which the error protection type is indicated. The actual payload data NS1 of the status message 1 are located in field 52. The error protection data RS1 are recorded in field 53. A Reed Solomon code is applied in this example. This error protection code is a block code and is located separately from the payload data in the separate field 53. However, the principal of the disclosure is applicable even if a convolutional code is used as the error protection code, i.e., for example, if a turbo code is used, wherein the payload data and error protection data are then contained in a joint field.

The format of the second information block is shown in the lower part of FIG. 5. Field 52 contains the payload data NS2 of the second information block. The error protection data for NS2 are located in field 53. A field 54 then follows, in which the delta information determined at the transmitting end in block 305 is recorded. The error protection data RS-Delta for the delta information is recorded in field 55. Field 51 contains the error protection type for RS2 and RS-Delta.

Figure 6:
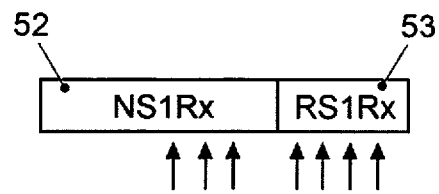
FIG. 6 shows the application of the delta information to the reception result of the first data transmission.

FIG. 6 shows how the delta signal is incorporated into the version of the first information block stored in the receive buffer 326. To do this, the delta application unit 328 uses the delta information retrieved from the second information block and performs the bit flipping operation as mentioned above through a change of sign at the bit positions indicated by the delta information in field 52 with the errored payload data NS1Rx and in field 53 with the possibly likewise errored error protection data RS1Rx.

Figure 7:
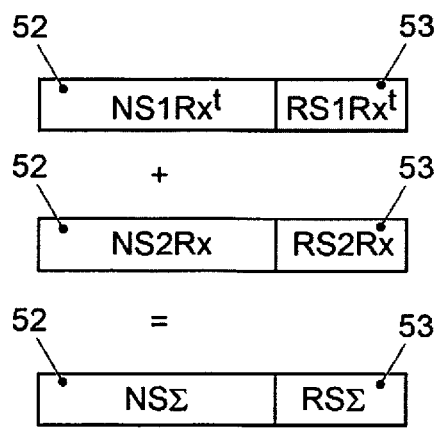
FIG. 7 shows the combination of the reception result of the second data transmission with the reception result of the first transmission modified through application of the delta information.

FIG. 7 finally shows the operation of the soft combining of the transformed first information block with the second information block, as it takes place in the soft combining unit 330. The soft information is added to NS2Rx and NS1Rxt. The soft information is similarly added to RS2Rx and RS1Rxt. The resulting summation information NSΣ and RSΣ is fed to the channel decoder 324 and is decoded. If successful, the payload NS2 is forwarded to a higher layer, e.g., the application layer of the receiving station. In this example, it is assumed that the delta information with its error protection component is separated from the information block only after the addition. In a different embodiment, this can already take place beforehand.

To summarize once more:
1. A first payload signal (CAM status message 1) is processed in the transmitting station and is transmitted in a conventional manner. The signal is coded and modulated for this purpose.
2. One or n further n payload signals (e.g., n=9 messages) are processed by the transmitter. The channel coding of the respective payload signal is carried out for this purpose. Before the respectively coded payload signal is transmitted in modulated form, the bit-by-bit difference compared with the first coded payload signal is calculated/generated. The result describes which bits differ between the coded signal of the previous message and the current message and is referred to below as the delta signal. It is similarly provided with error protection via channel coding, but in such a way that it can be decoded independently from the actual message. Both the payload signal and the generated delta signal are jointly modulated and dispatched.

Figure 8:
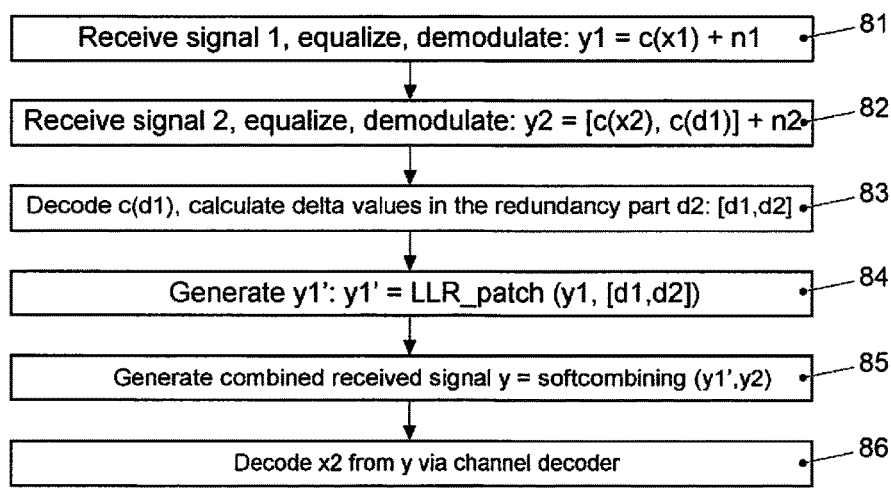
FIG. 8 shows a flow diagram for an exemplary embodiment of the method.

FIG. 8 shows the sequence of the processing operations in the receiving station in an exemplary embodiment.
3. The receiving station performs an equalization of the two received signals and demodulates them, but does not yet decode them, operations at 81 and 82. It first decodes the delta signal, operation at 83, and incorporates this into the soft information of the received signal, which corresponds to status message 1, operation at 84. This can be carried out highly efficiently. The soft information for an observation at the receiver is normally present as a log likelihood ratio (LLR, defined as $\log10(p0/p1)$, wherein $\log10( )$ is the logarithmic function to base 10, p0 is the probability that the current received signal represents the binary value 0 and p1 the probability that the current received signal represents the binary value 1), which enables an adaptation through simple changes of sign. From this modified signal, the receiver carries out a soft combining with the received signal, which corresponds to status message 2, operation at 85. It decodes the combined signal and then obtains the payload signal from status message 2, operation at 86.

If the status message 1 is still of interest at this time, it can similarly be retrieved via the delta signal and a further decoding process. To do this, the delta information is applied reciprocally to the second information block to generate Y2'. Operation at 85 of combining Y2' and Y1 then follows. The payload x1 is then obtained through further decoding in the channel decoder 324.

In the example embodiments described, the delta information referred to both the payload data part and the error protection component. However, it is also possible for the delta information to relate only to the payload data part. This is possible if the delta signal is compact. This is precisely the case if a linear systematic coding (input signal can be found at fixed, predefined positions in the coded signal) is used. In this case, the delta information to be transmitted is restricted to differences in the original payload signal. The receiver can itself then highly efficiently infer the changes in the redundancy part of the coded signal in the linear code. The method works both with block codes and with convolutional codes.

It should be understood that the proposed method and the associated devices can be implemented in various forms of hardware, software, firmware, special processors or a combination thereof. Special processors may comprise Application-Specific Integrated Circuits (ASICs), Reduced Instruction Set Computers (RISC) and/or Field Programmable Gate Arrays (FPGAs). The proposed method and the device may be implemented as a combination of hardware and software. The software may be installed as an application program on a program storage device. This typically involves a machine based on a computer platform which has hardware, such as, for example, one or more central units (CPU), a random-access memory (RAM) and one or more input/output (I/O) interfaces. Furthermore, an operating system is typically installed on the computer platform. The different processes and functions that have been described here may form part of the application program, or a part which is run via the operating system.

The disclosure is not limited to the example embodiments described here. There is scope for various adaptations and modifications which the person skilled in the art, due to his technical knowledge, would also consider as belonging to the disclosure.

REFERENCE NUMBER LIST

10 Internet
20 Base station
30 Vehicle
31 On-board unit
40 Evolved Packet Core EPC
50 Flow diagram
51 Header part
52 Payload data field
53 Error protection data field
54 Delta information data field
55 Delta error protection data field
81 1st processing operation
82 2nd processing operation
83 3rd processing operation
84 4th processing operation
85 5th processing operation
86 6th processing operation
302 Channel coding unit
304 Transmit buffer memory
305 Delta information generation unit
306 Rate matching unit
308 Modulation & transmission unit
310 Transmit antenna
320 Receive antenna
322 Reception & demodulation unit
324 Channel decoding unit
326 Receive buffer memory
328 Delta information application unit
330 Soft combining unit

The invention claimed is:

1. A method for digital transmission of data blocks from a transmitting station to a receiving station, the method comprising:
providing the data blocks with error protection data at the transmitting station, wherein the error protection is transmitted via a faulty transmission channel to the receiving station, wherein, for transmission of at least one further data block, positions at which the further data block differs from a preceding data block are identified at the transmitting station, wherein delta information obtained in this way is provided with corresponding error protection;
adding the delta information with error protection to the at least one further data block provided with error protection to provide an augmented further data block, wherein the delta information is provided with a higher error protection than the at least one further data block;
transmitting the resulting augmented further data block via the faulty transmission channel to the receiving station;
storing the received preceding data block and the at least one augmented further data block, including the error protection component, in the receiving station;
retrieving the delta information of the at least one augmented further data block;
applying the delta information to the stored preceding data block to change the stored preceding data block into a transformed received preceding data block that is in a form comparable with the at least one further data block, wherein the applying of the delta information changes the stored preceding data block into an information block which corresponds to information content of the at least one further block for subsequent processing through soft combining;
soft combining the received at least one further data block and the transformed received preceding data block to produce a combined data block; and
retrieving a payload of the at least one further data block from the combined data block.

2. The method of claim 1, wherein the delta information indicates the positions in the coded further data block at which data information is set differently than in the preceding coded data block.

3. The method of claim 2, wherein the data information corresponds to bit information.

4. The method of claim 1, wherein the received preceding data block and the at least one augmented further data block are stored in each case as a sampled signal before or after the digital demodulation.

5. The method of claim 4, wherein the received preceding data block and the at least one augmented further data block are stored following demodulation in each case as a log likelihood ratio soft information block.

6. The method of claim 5, wherein the combination corresponds to an addition of mutually corresponding soft information values of the data blocks to be combined.

7. The method of claim 5, wherein a channel decoding of the combined data block is carried out to retrieve the at least one further data block or the preceding data block.

8. The method of claim 4, wherein the delta information is applied reciprocally to the stored at least one further data block and the transformed at least one further data block and the preceding data block are combined.

9. The method of claim 1, wherein the delta information indicates the positions in the payload data field of the further data block at which data information is set differently than in the payload data field of the preceding coded data block.

10. A transportation vehicle comprising the transmitting station of claim 9.

11. A transportation vehicle including equipment for performing the method of claim 1.

12. A transmitting station for digital transmission of data blocks from the transmitting station to a receiving station, the transmission station comprising:
a channel coding unit which provides a data block with error protection data; and
a processing unit which, for the transmission of at least one further data block, determines the positions at which the further data block differs from the preceding data block, wherein the channel coding unit provides delta information obtained in this way with its own error protection data and adds the delta information to the at least one further data block provided with error protection,
wherein the channel coding unit provides the delta information with a higher error protection than the information of the further data block,
wherein the delta information is provided to the receiving station for application to change the preceding data block into a transformed received preceding data block that is in a form comparable with the at least one further data block received from the transmitting station, and wherein the application of the delta information changes the preceding data block into an information block which corresponds to information content of the at least one further block for subsequent processing through soft combining to produce a combined data block from which a payload of the at least one further data block is retrievable.

13. A transportation vehicle comprising the receiving station of claim 12.

14. The transportation vehicle of claim 13, further comprising a transmitting station for digital transmission of data blocks from the transmitting station to the receiving station, the transmission station including a channel coding unit which provides a data block with error protection data, and a processing unit which, for the transmission of at least one further data block, determines the positions at which the further data block differs from the preceding data block, wherein the channel coding unit provides the delta information obtained in this way with its own error protection data and adds the delta information to the at least one further data block provided with error protection.

15. A receiving station receiving digital transmission of data blocks from a transmitting station, the receiving station comprising:
  memory configured to store a preceding and at least one augmented further data block, including the error protection component;
  a channel decoding unit which decodes the stored first and at least one augmented further data block, wherein delta information of the at least one augmented further data block is first decoded and wherein the delta information has been provided with a higher error protection than the augmented further data block;
  a processing unit applies the delta information to the stored preceding data block to change the latter into a form which makes it comparable with the at least one further data block; and
  a combining unit combines the received at least one further data block and the transformed preceding data block, and the channel decoding unit decodes the combined data block to retrieve the payload of the further data block,
wherein the processing unit applies the delta information to the stored preceding data block to change the stored preceding data block into a transformed received preceding data block that is in a form comparable with the at least one further data block, wherein the processing unit applies the delta information such that the delta information changes the stored preceding data block into an information block which corresponds to information content of the at least one further block for subsequent processing through soft combining by the combining unit, following which, a payload of the at least one further data block is retrieved from the combined data block.

16. The receiving station of claim 15, wherein the memory stores the received preceding data block and the at least one augmented further data block after demodulation in each case as a log likelihood ratio soft information block.

\* \* \* \* \*